United States Patent
Kagerer et al.

(10) Patent No.: US 8,788,175 B2
(45) Date of Patent: Jul. 22, 2014

(54) METHOD OF CONTROLLING THE SPEED AND/OR THE DISTANCE FOR MOTOR VEHICLES

(71) Applicant: Bayerische Motoren Werke Aktiengesellschaft, Munich (DE)

(72) Inventors: Walter Kagerer, Munich (DE); Maria-Christina Laiou, Munich (DE); Torsten Seyffarth, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 13/765,100

(22) Filed: Feb. 12, 2013

(65) Prior Publication Data
US 2014/0114548 A1    Apr. 24, 2014

(30) Foreign Application Priority Data

Oct. 24, 2012 (DE) .......................... 10 2012 219 449

(51) Int. Cl.
*B60T 7/12* (2006.01)
*G05D 1/00* (2006.01)
*G06G 7/78* (2006.01)

(52) U.S. Cl.
USPC .......................................... 701/96; 701/301

(58) Field of Classification Search
USPC .......................................... 701/96, 300, 301
See application file for complete search history.

(56) References Cited

U.S. PATENT DOCUMENTS

| | | | |
|---|---|---|---|
| 2009/0164109 A1* | 6/2009 | Maruyama | 701/116 |
| 2009/0204304 A1* | 8/2009 | Urban et al. | 701/96 |
| 2011/0010094 A1* | 1/2011 | Simon | 701/301 |

FOREIGN PATENT DOCUMENTS

| | | |
|---|---|---|
| DE | 10 2005 036 049 A1 | 2/2007 |
| DE | 10 2006 056 631 A1 | 6/2008 |
| DE | 10 2008 057 367 A1 | 5/2010 |
| DE | 10 2009 007 885 A1 | 8/2010 |
| DE | 10 2010 032 086 A1 | 3/2011 |
| DE | 10 2011 102 437 A1 | 11/2012 |

OTHER PUBLICATIONS

German Search Report with partial English translation Dated Jun. 19, 2013 {Ten (10) Pages}.
German Office Action Dated Jun. 19, 2013 {Six (6) Pages}.

* cited by examiner

*Primary Examiner* — John R Olszewski
*Assistant Examiner* — Daniel Johnson
(74) *Attorney, Agent, or Firm* — Crowell & Moring LLP

(57) ABSTRACT

A method of controlling the speed and/or the distance for motor vehicles having distance-controlled cruise control systems is provided in which a sensor unit determines relevant data of a vehicle driving ahead. In the event of a detection of a target object driving ahead, desired acceleration values and/or desired deceleration values for reaching a predetermined desired distance to the target object are determined and outputted. While considering the relevant data of the target object, a swinging-out probability of the target object is determined and, as a function of the determined swinging-out probability, an adaptation of the desired distance to the target object is carried out.

4 Claims, 2 Drawing Sheets

METHOD OF CONTROLLING THE SPEED AND/OR THE DISTANCE FOR MOTOR VEHICLES

CROSS REFERENCE TO RELATED APPLICATION

This application claims priority under 35 U.S.C. §119 from German Patent Application No. DE 10 2012 219 449.5, filed Oct. 24, 2012, the entire disclosure of which is herein expressly incorporated by reference.

BACKGROUND AND SUMMARY OF THE INVENTION

The invention relates to a method of controlling the speed and/or the distance for motor vehicles having distance-controlled cruise control systems.

Motor vehicles with cruise control systems have been known for a long time. Most currently available cruise control systems control the speed of the motor vehicle to a predefined desired or specified speed. In addition to these cruise control systems, currently also longitudinal control systems expanded by a distance control, so-called distance-controlled cruise control systems, can be purchased from some manufacturers. Such systems, which are offered, for example, by the applicant of the present patent application under the name "Active Cruise Control", make it possible to automatically guide the motor vehicle at a desired or a correspondingly lower speed while maintaining a predefined distance from a vehicle driving ahead. In principle, the generally known cruise control, which maintains a certain predefined speed, is expanded by an additional distance function, so that the use of such an "active" cruise control also becomes possible in dense turnpike and country road traffic. This so-called "active cruise control" maintains the predefined desired or specified speed when the own traffic lane is vacant. When a distance sensor system, which is mounted on the motor vehicle and which, in particular, can operate on a radar basis, detects in its own lane a target object or (motor) vehicle driving ahead at a speed lower than the predefined desired speed, its own speed is adapted within the scope of a so-called automatic distance control, for example, by causing a suitable braking torque, to the speed of the motor vehicle driving ahead or the target object, such that a distance control contained in the "active cruise control" or in the corresponding cruise control system will automatically maintain a predefined distance from the vehicle driving ahead or the target object, which is suitable for the situation. As a rule, such distance-controlled cruise control systems are active or can be activated only to a minimal speed of, for example, 30 km/h, but can be expanded by a so-called stop-and-go function, so that a distance-related cruise control can take place until the vehicle is stopped or from a stopped position.

When the predefined desired speed deviates from the current speed or when following the predefined distance to the target object deviates from the current distance, within the scope of the cruise control a desired acceleration value or deceleration value for accelerating or decelerating the vehicle to the predefined desired speed or the predefined desired distance is determined and outputted. The determined desired acceleration value or desired deceleration value and the resulting acceleration change are measures for the dynamics of the vehicle in the normal operation.

In order to be able to configure the determination of the desired acceleration value and/or of the desired deceleration value so that they can be understood by the driver, various parameters, such as the geometrical course of the road, may be included in the determination of the desired acceleration value or desired deceleration value. In addition to the above-mentioned parameters, the traffic environment can also be taken into account. From German Patent Document DE 10 2006 056 631 A1, a method of controlling speed and/or distance for motor vehicles having distance-controlled cruise control systems is known whereby, for determining a desired acceleration value and/or a desired deceleration value for reaching a predefined speed and/or a predefined distance with respect to a vehicle driving ahead, the current traffic situation is taken into account such that, from the data for determining the current traffic situation, a traffic jam probability value is determined, and, as a function of the traffic jam probability value, an optimal desired acceleration value and/or desired deceleration value is determined. In this case, the data for determining the current traffic situation supply environment-monitoring sensor data and/or operating data of the motor vehicle.

Furthermore, from German Patent Document DE 10 2008 057 367 A1, a method of controlling speed and/or distance for motor vehicles having distance-controlled cruise control systems is known, whereby, from the determined specific data of the target object driving ahead and of a front object driving ahead of the target object, a situation probability is determined at least for one predefined situation and, as a function of this situation probability, the desired acceleration value and/or the desired deceleration value is determined.

A large deviation between the predefined desired distance and the current distance to the target object may occur particularly if the target object leaves the lane or exits from the detection range of the sensor unit. If this is so, in the case of conventional systems, a relatively high acceleration of the vehicle is prompted for reaching the desired speed or the predefined desired distance to the target object, which, when the desired speed or the desired distance has been reached, will abruptly cease again. In order to bypass this problem, it is suggested in German Patent Document DE 10 2010 032 086 A1 that, when an actual distance is detected that is high in comparison to the desired distance (for example, as a result of the exiting of the target object driving ahead from the detection range), a drive-up speed is determined as a function of the speed of the vehicle momentarily driving ahead, and that the speed of the vehicle is temporarily controlled to the drive-up speed. In this case, it is a disadvantage that a temporary adaptation of the distance-related cruise control takes place relatively late, thus not before the target object falls away.

It is now an object of the invention to indicate a method of controlling the speed and the distance in the event of a swinging-out of the target object, which is improved with respect to the state of the art and results in a fluid vehicle handling that the driver can understand.

The invention starts out from a method of controlling the speed and/or the distance for motor vehicles having distance-controlled cruise control systems, wherein, in principle, relevant data of a vehicle driving ahead are determined by a sensor unit and, when a target object (vehicle in its own traffic lane at a lower speed than the desired speed) is detected, desired acceleration values and/or desired deceleration values for reaching and maintaining a predefined desired distance to the target object are determined and outputted, so that the motor vehicle will follow the target object at the predefined desired distance (=so-called following distance-controlled drive).

The invention is based on the recognition that, when a consideration of a future or probable swinging-out of the target object or of a lane change of the target object is absent, effects on dynamics may occur when controlling the speed which are not appropriate for the respect traffic situation. This may irritate the driver and lead to a lack of confidence in the distance-controlled cruise control system, particularly also if the target object leaving the traffic lane is still classified as being relevant and the normal desired distance is still maintained. In such a situation, a normal driver would already drive up to the object during the swinging-out.

It is now the basic idea of the invention to image in the distance-controlled cruise control system the normal vehicle handling by a driver during the swinging-out of a vehicle driving ahead. Based on the above, the process according to the invention is characterized in that, while taking into account relevant data of the target object, a swinging-out probability of the target object is determined, and in that, as a function of this determined swinging-out probability (in the sense of a pre-conditioning), an adaptation of the desired distance to the target object is carried out, to which the adjusting then takes place. Corresponding to the normal vehicle handling, advantageously as a function of the swinging-out probability, a reduction of the desired distance to the target object takes place, specifically such that, as the swinging-out probability rises, the desired distance is (continuously) reduced to a predefined desired minimal distance. This means that, as the swinging-out probability rises, the predefined desired distance to the (swinging-out) target object is shortened, so that the predefined desired minimal distance is reached at a swinging-out probability of at least almost 100%.

The sensor unit for detecting the relevant data (of the target object) ideally comprises at least one camera-based sensor and/or a radar-based sensor, the camera-based sensor mainly being suitable for detecting the swinging-out of the target object (by evaluating the distance to the lane boundary) and/or the lateral velocity and/or a turn signal operation), and the radar-based sensor is suitable for determining specific operating data of the target object (for example, by evaluating the distance between the target object and the motor vehicle).

Advantageously, a swinging-out probability is basically determined only when predefined outline conditions are present. These may be the following criteria:

only on a straight road (known from navigation data or recognizable by a camera);

only in the case of a multi-lane road (known from navigation data or recognizable by a camera).

Only if these criteria have been met, will a probability detection by evaluating the distance between the vehicle and the target object and/or the lateral velocity of the target object make sense at all.

Advantageously, the buildup (and the lowering) of the swinging-out probability in the swinging-out information, which is supplied by the sensor unit or an individual sensor (such as a camera), starting from the point in time a swinging-out of the target object is recognized or detected from the data of the sensor unit (for example, the distance of the target object to the traffic lane boundary and/or the lateral velocity of the target object), the swinging-out probability will rise from zero to 100% within a defined time window. However, other criteria may also be taken into account when determining the swinging-out probability. This may, for example, be the current speed of the own motor vehicle and/or the speed of the target object and/or the distance of the target object to the vehicle and/or the distance of a front object situated in front of the target object and/or its speed. These data may also be included directly in the determination of the (changed) desired distance and/or of the weighting factor.

Simultaneously with the determination and the buildup (and the lowering) of the swinging-out probability, as a function of the swinging-out probability, a weighting factor for the influence of a determined distance error on the determination of the desired acceleration value and/or of the desired deceleration value can be determined for reaching the predefined desired distance, which is increased as the swinging-out probability rises. The higher this weighting factor, the faster or better the new (reduced) desired distance will then be set. This results in an acceleration of the motor vehicle, so that the transition to the front object (=the vehicle driving in front of the target object) will take place rapidly and comfortably when the swinging-out target object actually changes the lane.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
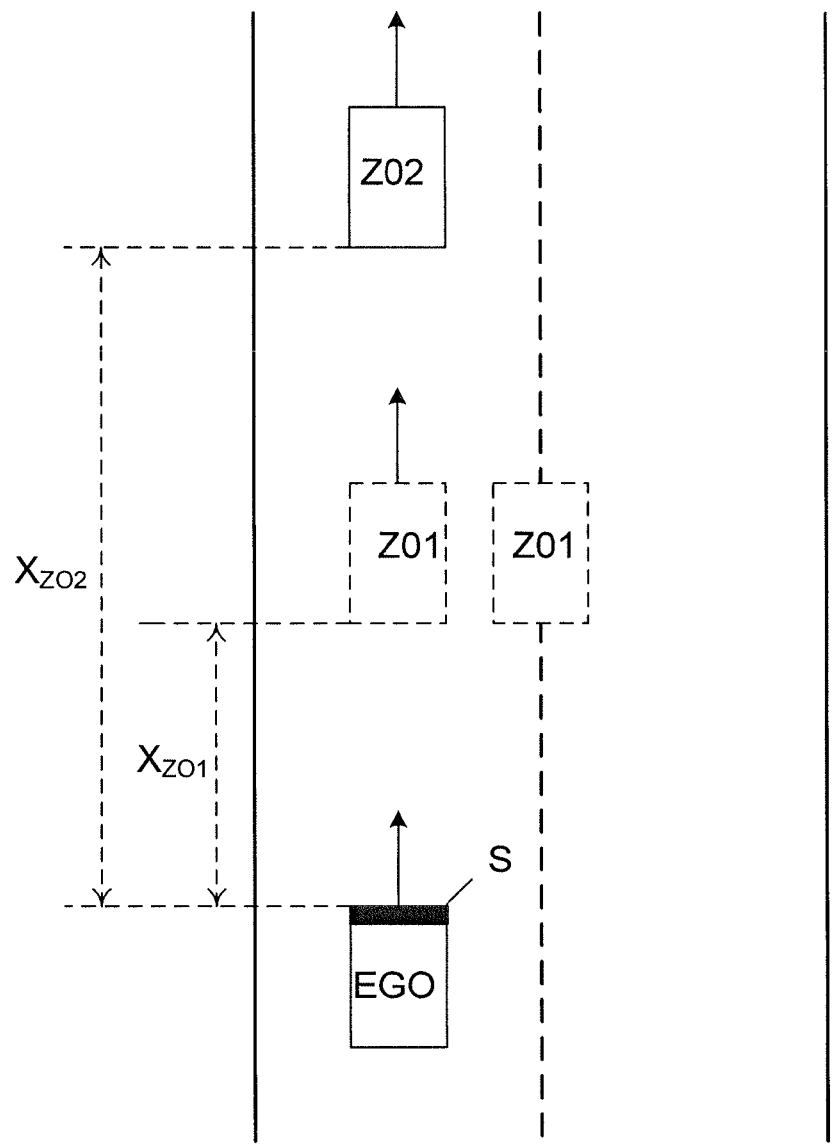
FIG. 1 is a view of a swinging-out traffic situation.

FIG. 1 illustrates a traffic situation with a motor vehicle EGO that is equipped with a distance-controlled cruise control system and, within the scope of this speed or distance control is correspondingly controlled or automatically controlled, because of a detected target object Z01 driving ahead, by the corresponding determination and output of desired acceleration values and/or desired deceleration values for reaching or maintaining a predefined distance $X_{Z01}$. For detecting the vehicle Z01 driving ahead, particularly its position, its longitudinal speed and lateral velocity, the vehicle EGO is equipped with a sensor unit S which sends relevant data to the control device of the distance-controlled cruise control system influencing the longitudinal control.

A further front object Z02 is situated in the same traffic lane in front of the target object Z01, which front object Z02 has the distance $X_{Z02}$ to the motor vehicle EGO. It is further recognizable in FIG. 1 that the target object Z01 is moving to the right in the direction of the next lane on the right; i.e. it can be assumed that the target object Z01 intends to swing out to the right from the currently traveled lane.

Figure 2:
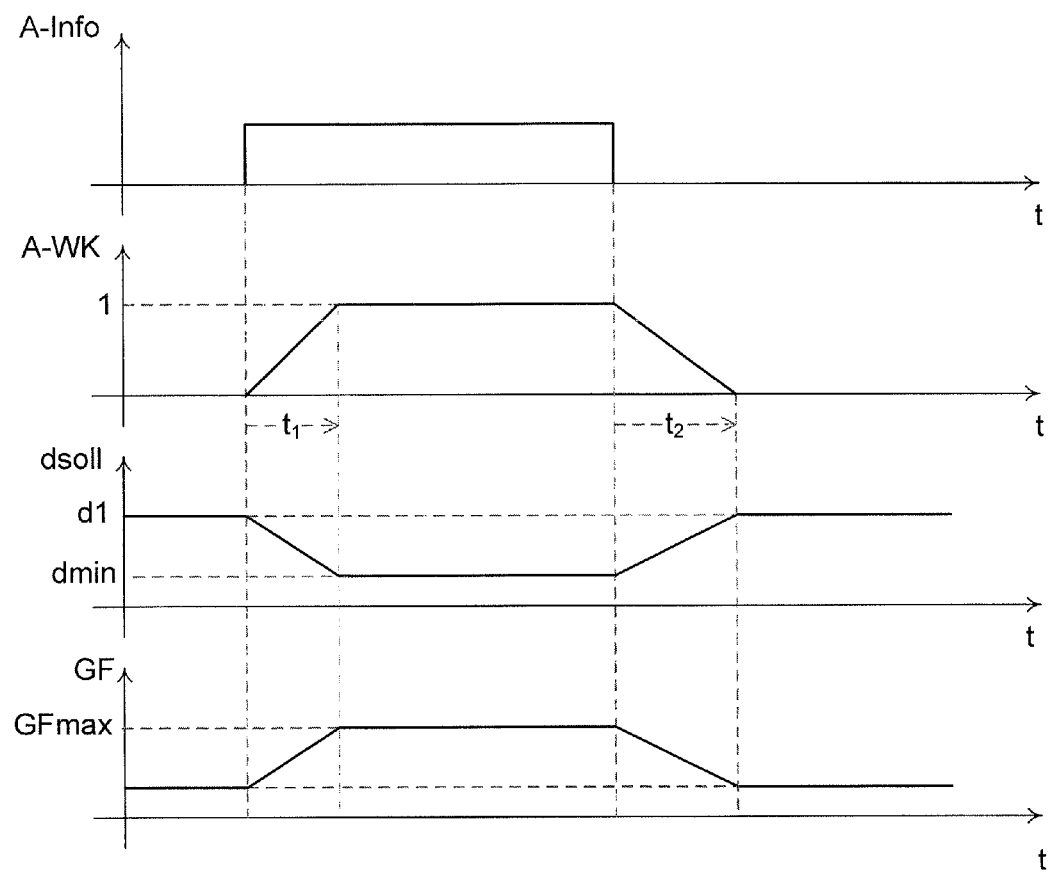
FIG. 2 is a view of several parameter values which are plotted over the time and occur or are determined in the case of the above-mentioned swinging-out traffic situation.

With reference to the traffic situation in FIG. 1, FIG. 2 now illustrates the connection between swinging-out information A-Info detected by the corresponding sensor system S, a determined swinging-out probability A-WK, a determined or predefined desired distance dsoll between the motor vehicle EGO and the target object Z01, and a weighting factor GF correspondingly determined on the basis of the swinging-out probability A-WK for the influence of the determined distance error between the actual distance $X_{Z01}$ and the determined predefined desired distance dsoll between the motor vehicle EGO and the target object Z01 on the determination of the desired acceleration value and/or the desired deceleration value for the (rapid) reaching of the predefined desired distance dsoll.

The swinging-out information A-Info is outputted while taking into account the sensor unit S integrated in the motor vehicle EGO, which monitors the traffic in the area in front of the vehicle, and determines other relevant information, such as the lane boundary. The sensor unit S consists of a combination of a camera and a radar sensor. As soon as it is detected, for example, by the camera, that the current control object (i.e., the target vehicle Z01) is approaching the right-hand traffic lane at a corresponding lateral velocity, the control device evaluating the data of the camera will output swinging-out information A-Info. As soon as the swinging-out information A-Info is present, the swinging-out probability A-WK will rise continuously from zero to 1 over the time period $t_1$.

Simultaneously with the increase of the swinging-out probability A-WK, the predefined desired distance dsoll to the swinging-out target object Z01 to be set is reduced from the originally valid desired distance d1 continuously to a minimally permitted desired minimal distance dmin, which is reached isochronously with the reaching of the 100% swinging-out probability A-WK.

Likewise, isochronously with the increase of the swinging-out probability A-WK and the reduction of the desired distance dsoll, the weighting factor GF for the weighting of the distance error when providing a corresponding desired acceleration value for reaching the new desired distance dmin, is increased to a predefined maximum GFmax.

As soon as the (original) target object Z01 has left the traffic lane and is therefore no longer considered the relevant target object, the swinging-out information A-Info will be withdrawn. Starting at this point in time, analogous to the increase of the swinging-out probability A-WK, the swinging-out probability A-WK is also continuously lowered from one to zero over a predefined second time period $t_2$. Likewise, isochronously, the desired distance dsoll to the control object (now the front object Z02) is raised again to the originally applicable desired distance d1, and the weighting factor GF is reduced to the initial value.

This method according to the invention for the determination of a desired acceleration value and/or a desired deceleration value while taking into account a determined swinging-out probability of the current target object permits a more fluid and thus driver-like and plausible action in the case of the distance-controlled cruise control system.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of controlling the speed and/or the distance for motor vehicles having distance-controlled cruise control systems, comprising the acts of:
   detecting a target object driving ahead of a vehicle having a sensor unit for determining data of the target object;
   determining at least a distance of the target object driving ahead of the vehicle based on the sensor-determined data;
   determining a swinging-out probability of the target object based at least on the sensor-determined data;
   determining a weighting factor as a function of the swinging-out probability, for weighting a determined distance error;
   determining a desired distance to the target object;
   altering the desired distance as a function of the swinging-out probability and the weighing factor; and
   outputting at least one of desired acceleration and desired deceleration values to the vehicle to adjust the distance to the target object to the altered desired distance,
   wherein
   as the swinging-out probability rises, the altered desired distance is reduced, and
   the altered desired distance is limited to a predefined minimal desired distance.

2. The method according to claim 1, wherein the sensor unit comprises at least one of a camera-based and a radar-based sensor.

3. The method according to claim 1, wherein the swinging-out probability is determined as a function of at least one of a distance of the target object to a lane boundary, a lateral velocity of the target object, a speed of the target object, the distance of the target object, a current speed of the vehicle, and sensor-determined data of a vehicle in front of the target object.

4. The method according to claim 1, wherein the swinging-out probability is determined only if predefined conditions are present, and the predetermined conditions include at least one of a course of a road on which the vehicle is operating is approximately straight and the road is a multi-lane road.

* * * * *